US008678499B2

(12) United States Patent
Kelly

(10) Patent No.: US 8,678,499 B2
(45) Date of Patent: Mar. 25, 2014

(54) BOOSTER CUSHION FOR USE WITH A VEHICLE SEAT

(75) Inventor: Grainne Kelly, Derry (GB)

(73) Assignee: Emagination Limited, Derry (GB)

( * ) Notice: Subject to any disclaimer, the term of this patent is extended or adjusted under 35 U.S.C. 154(b) by 144 days.

(21) Appl. No.: 13/262,281

(22) PCT Filed: Mar. 26, 2010

(86) PCT No.: PCT/EP2010/001910
§ 371 (c)(1),
(2), (4) Date: Sep. 30, 2011

(87) PCT Pub. No.: WO2010/112175
PCT Pub. Date: Oct. 7, 2010

(65) Prior Publication Data
US 2012/0019033 A1    Jan. 26, 2012

(30) Foreign Application Priority Data

Apr. 3, 2009  (GB) .................................. 0905831.4
Jun. 22, 2009 (GB) .................................. 0910652.7

(51) Int. Cl.
*A47D 1/10*          (2006.01)

(52) U.S. Cl.
USPC ............. 297/256.16; 297/219.12; 297/452.41

(58) Field of Classification Search
USPC ............... 297/219.12, 250.1, 452.41, 256.16, 297/481, 482, 440.15, 228.12
See application file for complete search history.

(56) References Cited

U.S. PATENT DOCUMENTS

| 3,161,436 | A |   | 12/1964 | Hood |
| 3,400,413 | A |   | 9/1968  | La Grossa |
| 4,583,253 | A | * | 4/1986  | Hall .................................... 5/94 |
| 4,789,202 | A | * | 12/1988 | Alter .......................... 297/284.6 |
| 4,836,605 | A | * | 6/1989  | Greenwood et al. ........ 297/250.1 |
| 4,854,638 | A | * | 8/1989  | Marcus et al. ........... 297/256.11 |

(Continued)

FOREIGN PATENT DOCUMENTS

| CN | 2607285 Y | 3/2004 |
| CN | 2915593 Y | 6/2007 |

(Continued)

OTHER PUBLICATIONS

International Search Report of the International Searching Authority from corresponding Patent Cooperation Treaty (PCT) Application No. PCT/EP2010/001910, mailed Jun. 28, 2010.

(Continued)

*Primary Examiner* — David R Dunn
*Assistant Examiner* — Alexander Harrison
(74) *Attorney, Agent, or Firm* — Gardner, Linn, Burkhart & Flory, LLP

(57) ABSTRACT

A booster cushion for use in a vehicle, comprising a base (2) consisting of at least one inflatable member, upon which the child may sit, and a harness (6) adapted to fit over at least a front portion of the base to retain the base, said harness being provided with seat belt receiving members (14, 16) on either side of the harness (6) to be positioned, in use, on either side of the base (2) for receiving a lap belt portion of a vehicle seat belt to retain the base (2) upon the vehicle seat and such that the lap belt portion extends over the pelvic region of a child.

15 Claims, 3 Drawing Sheets

(56) References Cited

U.S. PATENT DOCUMENTS

| | | | |
|---|---|---|---|
| 5,005,902 A | | 4/1991 | Farnworth et al. |
| 5,183,311 A | * | 2/1993 | Meeker et al. ................. 297/151 |
| 5,292,175 A | * | 3/1994 | Artz ........................... 297/250.1 |
| 5,335,968 A | * | 8/1994 | Sheridan et al. ............ 297/250.1 |
| 5,474,355 A | * | 12/1995 | Lerner et al. .................... 297/36 |
| 5,487,197 A | * | 1/1996 | Iskra et al. ........................ 5/654 |
| 5,536,066 A | * | 7/1996 | Sedlack ...................... 297/250.1 |
| 5,765,502 A | | 6/1998 | Haugh |
| 5,855,415 A | | 1/1999 | Lilley, Jr. |
| 5,868,463 A | * | 2/1999 | MacKenzie et al. ...... 297/228.12 |
| 6,447,059 B1 | * | 9/2002 | Jackson et al. ............ 297/228.12 |
| 7,021,710 B2 | * | 4/2006 | Kain et al. ................ 297/256.11 |
| D542,478 S | | 5/2007 | Andriola |
| 7,220,376 B2 | | 5/2007 | Hetzel et al. |
| D545,407 S | | 6/2007 | Chiu |
| 7,261,380 B2 | * | 8/2007 | Ha ........................... 297/452.41 |
| 7,347,241 B2 | * | 3/2008 | Gardetto ....................... 152/396 |
| 7,571,961 B2 | * | 8/2009 | Gold et al. ...................... 297/255 |
| D614,816 S | | 4/2010 | Zine |
| 7,926,135 B1 | | 4/2011 | Leach |
| D637,031 S | | 5/2011 | Anderson |
| 8,152,238 B2 | * | 4/2012 | Timme et al. ............... 297/250.1 |
| D672,996 S | | 12/2012 | Kelly |
| 2002/0167214 A1 | * | 11/2002 | Nelson et al. ................. 297/485 |
| 2005/0225137 A1 | * | 10/2005 | Mead et al. ................ 297/250.1 |
| 2006/0232056 A1 | * | 10/2006 | Moendel ....................... 280/808 |
| 2007/0046084 A1 | | 3/2007 | Leach |
| 2008/0036256 A1 | * | 2/2008 | Gold et al. ..................... 297/255 |
| 2012/0242128 A1 | * | 9/2012 | Wessman et al. .......... 297/250.1 |
| 2013/0015690 A1 | * | 1/2013 | Mendis et al. ............. 297/250.1 |
| 2013/0088058 A1 | * | 4/2013 | Szakelyhidi et al. .... 297/256.16 |

FOREIGN PATENT DOCUMENTS

| | | |
|---|---|---|
| CN | 200960866 Y | 10/2007 |
| CN | 201646466 | 11/2010 |
| DE | 2655512 A1 | 6/1978 |
| DE | 3231263 A1 | 2/1984 |
| DE | 202005015381 U1 | 12/2005 |
| DE | 212010000002 | 10/2011 |
| EP | 1440853 A1 | 7/2004 |
| FR | 2310902 A2 | 12/1976 |
| FR | 2539287 A1 | 7/1984 |
| GB | 2277863 A | 11/1994 |
| GB | 2442437 A | 9/2008 |
| GB | 2474551 A | 9/2010 |
| WO | 2008145792 A1 | 12/2008 |
| WO | 2010108398 A1 | 9/2010 |

OTHER PUBLICATIONS

International Search Report in International Application No. PCT/CN2010/070441, dated May 6, 2010.

* cited by examiner

BOOSTER CUSHION FOR USE WITH A VEHICLE SEAT

FIELD OF THE INVENTION

This invention relates to booster cushion for use with a vehicle seat to enable a child to be safely restrained by an existing seat belt associated with said vehicle seat.

BACKGROUND OF THE INVENTION

Legislation in the UK requires children over three years old and under 12 years old or under 135 cm tall to use a booster seat or booster cushion when travelling in the front or rear of a car or van.

Booster seats and cushions typically comprise a rigid polystyrene or plastic moulded base upon which a child can sit to raise the child to a position wherein the existing car seat belt is positioned correctly on the child's body. The base is normally provided with projecting side members extending upwardly and forwardly from the rear of the base on either side of the base around which at least the lap portion of the seat belt may be guided to retain the booster seat in place and to ensure that the lap portion of the seat belt rests across the pelvic region of the child and not across the child's stomach where it may cause injury.

Booster seats and booster cushions are often categorised by their use and are referred to by groups, namely:—
 Group 2: for children weighing 15-25 kgs (33-55 lbs) roughly 4 to 6 years;
 Group 3: for children weighing 22-36 kgs (48-79 lbs) roughly from 6-11 years.

Many booster seats and cushions are designed for children between 15 kg and 36 kg (33-79 lbs), covering both Group 2 and Group 3.

Booster cushions comprise a base cushion for the child to sit upon. Booster seats have an additional backrest attached to the base, typically provided with an upper seat belt guide to hold the upper portion of the seat belt in the correct position across the child's shoulder. Some booster seats are designed to be converted into a booster cushion by detaching the backrest.

Booster seats and booster cushions do not have an integral harness to hold the child in place and rely on the vehicle seat's existing three point seat belt or lap belt to restrain the child. The purpose of the booster seat or cushion is to ensure that the seat belt fits correctly such that the lap belt or lap belt portion of the seat belt extends over the pelvic region of the child, not the stomach, and such that the diagonal portion of a three point seat belt rests over the shoulder of the child, not the neck A problem with existing booster cushions and seats is that, due to the rigid nature of the base of the cushion, they are bulky and awkward to carry and not very comfortable to sit upon. While attempts have been made to develop inflatable booster cushions that can provide greater comfort and be deflated to reduce the size of the cushion when not in use (see GB 2 442 437), none of the previous attempts have been able to provide adequate performance due to the inherent flexibility of the inflatable cushion and the difficulty of adequately guiding the lap belt portion of the seat belt to ensure that the booster cushion is retained correctly on the vehicle seat and that the lap belt remains in the correct position on the child without resting on the child's stomach with the resulting risk if serious injury in a collision.

SUMMARY OF THE INVENTION

According to a first aspect of the present invention there is provided a booster cushion for use in a vehicle comprising a base, comprising at least one inflatable member, upon which the child may sit, and a harness adapted to fit over at least a front portion of the base to retain the base, said harness being provided with seat belt receiving members on either side of the harness to be positioned, in use, on either side of the base for receiving a lap belt portion of a seat belt to retain the base upon the seat and such that the lap belt portion extends over the pelvic region of a child.

Preferably the seat belt receiving members each comprise a seat belt receiving clip through which the lap belt may pass to retain the lap belt therein such that, in use, the lap belt is guided over the pelvic region of a child sat on the booster cushion and not over the child's stomach. Preferably the seat belt receiving clips are formed from a rigid material. In one embodiment, each clip comprises an elongate base portion and a pair of inwardly extending opposed arms portions extending from the ends of the base portion to extend parallel to said base portion for retaining a seat belt strap between said base portion and opposing arm portions, a gap being provided between the arm portions to permit said seat belt strap to be inserted between the base portion and arms portions. The base may be provided with an aperture for receiving a strap member for securing the receiving clip to the base.

In one embodiment, the harness comprises a plurality of interconnected strap members comprising at least one transverse strap arranged to extend around the base and at least one longitudinal strap arranged to extend from an upper region of said at least one transverse strap on an upper region of the base to a lower region of the at least one transverse strap on a lower region of the base, said at least one longitudinal strap extending around a front side of the base. Preferably said seat belt receiving members are attached to said at least one transverse strap to be positioned on respective sides of the base. Preferably two spaced apart longitudinal straps are provided extending between said upper and lower regions of the at least one transverse strap.

In one embodiment said at least one inflatable member comprises an air tight chamber having an inflation valve for inflating and deflating said chamber. The chamber may contain open cell foam to provide a self inflating effect when the inflation valve is open. Preferably the inflation valve is located on a lower portion of the base, at or adjacent a rear side thereof.

At least an upper portion of the base and harness may be covered by a fabric outer cover. Preferably the cover is provided with openings or slots on lateral sides thereof, preferably adjacent an upper side of the cover, through which the belt receiving members may pass. The harness may be connected to the outer cover. An upper portion of the cover may be padded for comfort. A peripheral member may be attached to an upper portion of the cover to extend around a rear and lateral sides of the cover to provide greater support for a child and to prevent a child from sliding off the sides of the cushion.

According to a further aspect of the present invention there is provided a booster seat comprises a booster cushion in accordance with said first aspect and a backrest attached thereto.

Preferably said backrest includes a seat belt guide for guiding the seat belt over the shoulder of a child sat one the booster seat.

The backrest may comprise at least one inflatable chamber.
The backrest may be detachable from the seat cushion.

BRIEF DESCRIPTION OF THE DRAWINGS

Embodiments of the present invention will now be described, by way of example only, with reference to the accompanying drawings, in which:—

DETAILED DESCRIPTION OF THE PREFERRED EMBODIMENTS

Figure 1:
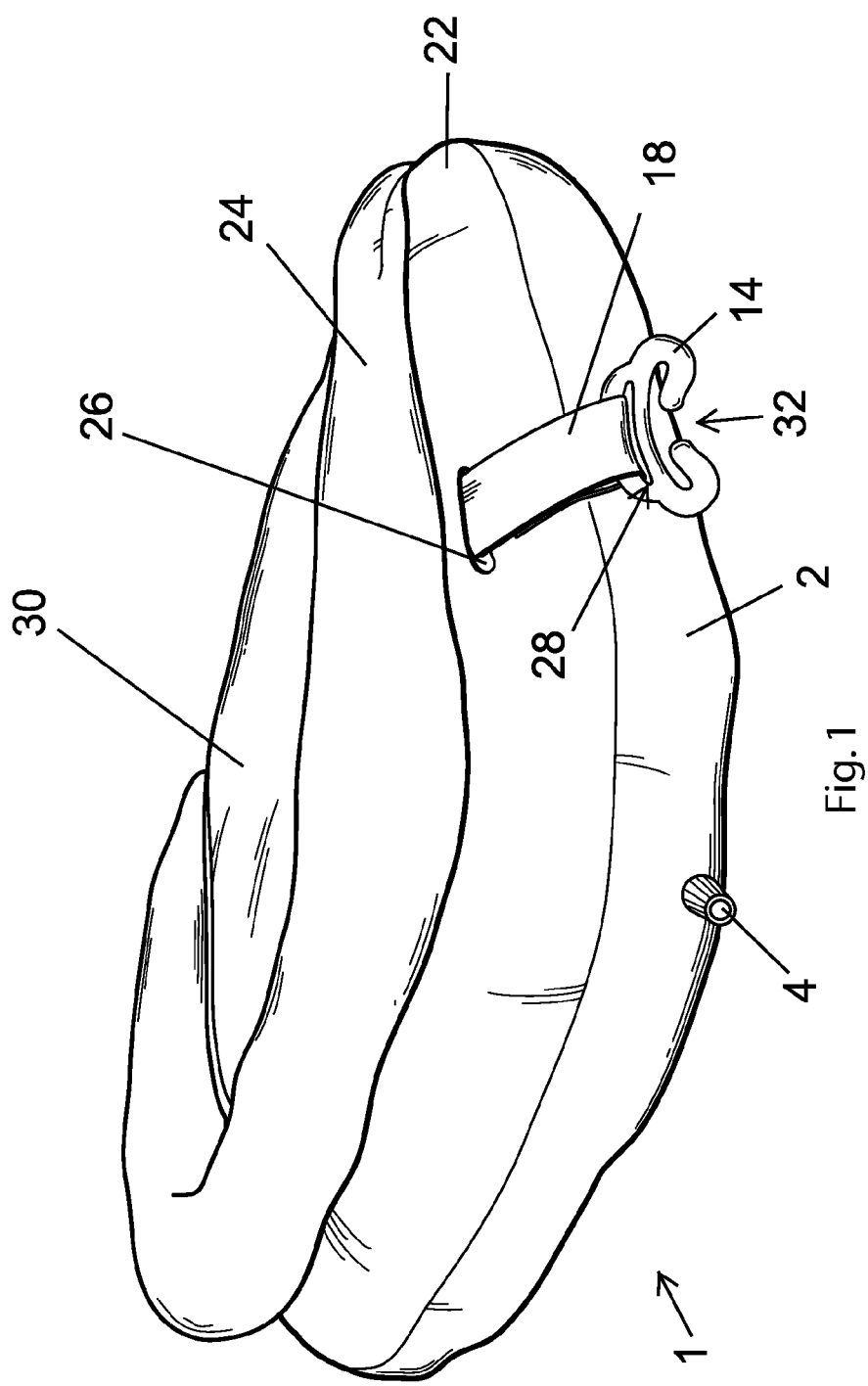
FIG. 1 is a perspective view of a booster cushion according to an embodiment of the present invention.

A booster cushion 1 according to an embodiment of the present invention, as illustrated in the drawings, comprises a base member 2 having an outer skin formed from a material impervious to air, one or more closed air chambers being defined within said outer skin, at least one of the air chambers containing an open cell foam to maintain the shape of the base member and to provide a self inflating effect when an air valve 4 provided on a rear side of the base member 2 is opened to allow air to enter the one or more chambers within the base member 2. Such inflatable air chambers are known in relation to self inflating mattresses and similar materials as those used for such known mattresses may be used for the base member 2 of the booster cushion 1.

Internal ribs within the one or more air chambers may be provided for ensuring the base member 2 defines the required shape when the air chamber are inflated.

In one embodiment, the base member 2 may be formed such that the booster cushion 1 has the following dimensions:—

Back of cushion 30 cm wide;
Front of cushion 35 cm wide;
Length of cushion 36 cm;
Height/thickness of cushion at rear side 8 cm;
Height/thickness of cushion at front side 3 cm.

However, the base member 2 may be shaped and formed to provide a seat cushion of any desired dimensions.

Figure 2:
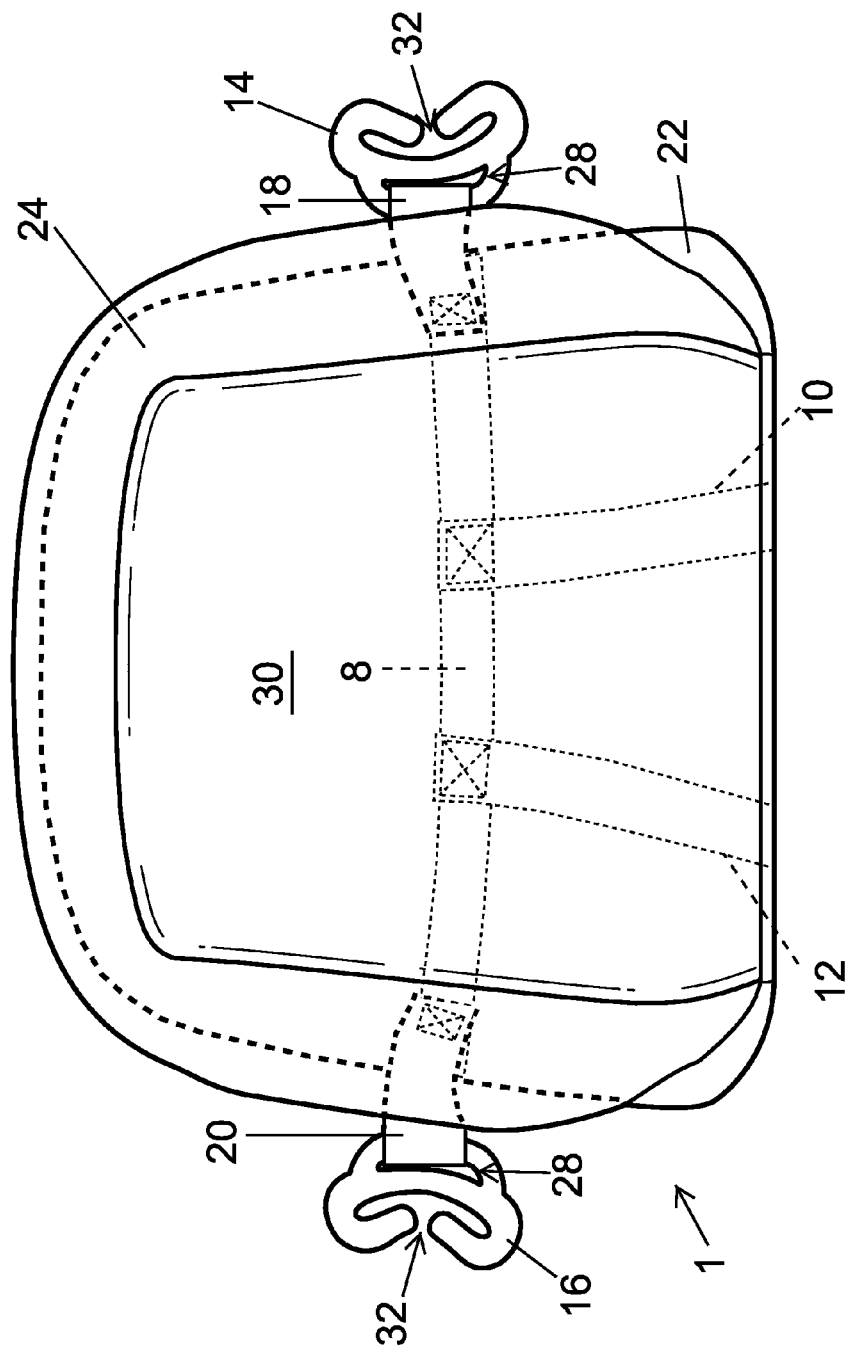
FIG. 2 is a plan view from above of the booster cushion of FIG. 1.
Figure 3:
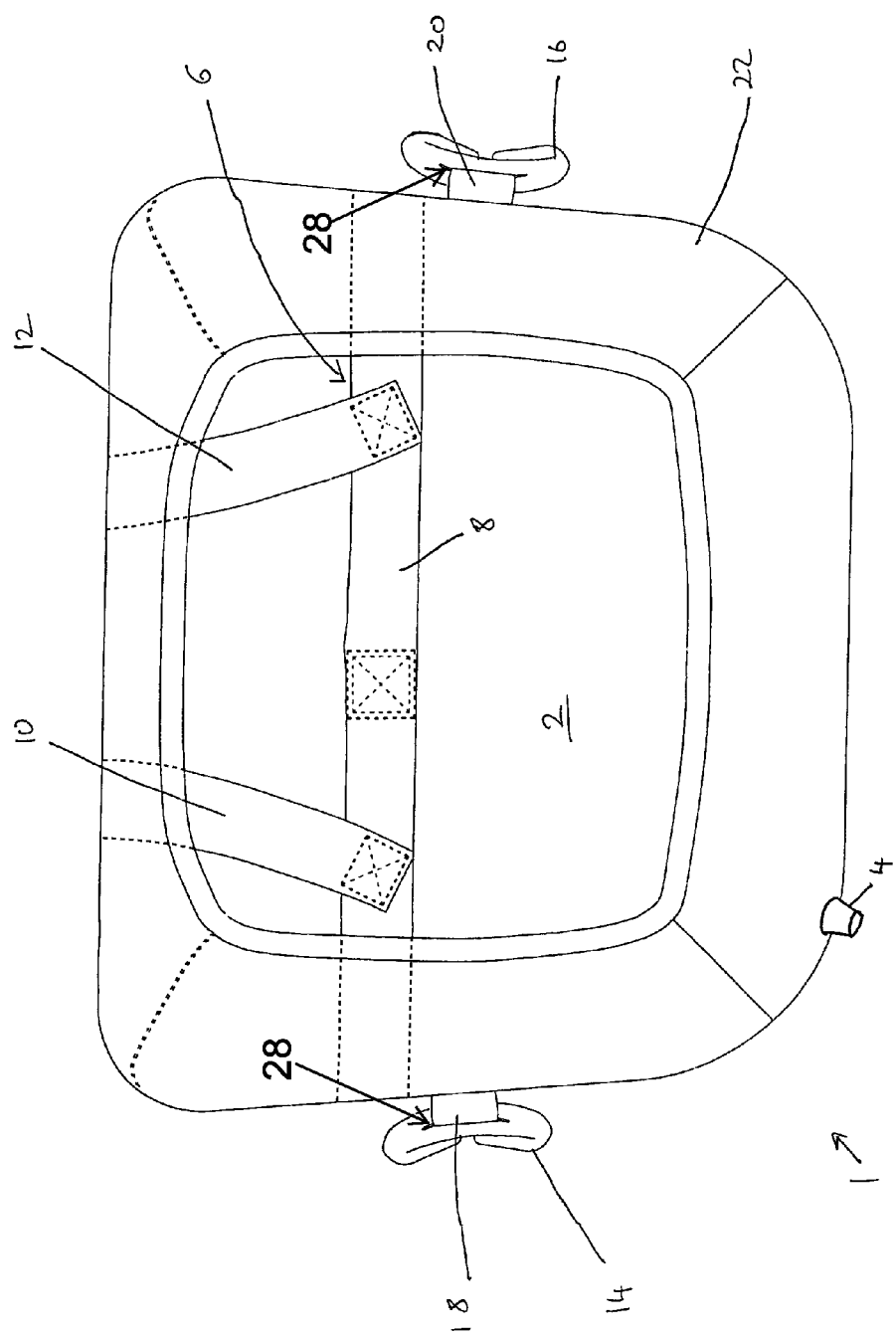
FIG. 3 is a plan view from below of the booster cushion of FIG. 1.

A harness 6 is fitted over a front portion of the base member 2, the harness 6 comprising a plurality of interconnected straps including a transverse strap 8 extending around the base member 2 across the width of the base member and two longitudinal straps 10,12 extending from a lower region of the transverse strap 8 to an upper region of the transverse strap 8 to extend around a front side of the base member 2 (FIGS. 2 and 3). The straps forming the harness 6 may be similar to those used to form vehicle seat belts and may be sewn together to define said harness 6. Preferably the transverse and longitudinal straps are dimensioned such that the transverse strap 8 extend transversely around the base member 2 at a position approximately 150mm from the rear side of the base member 2.

A pair of seat belt guide clips 14,16 are provided on either side of the base member 2, each seat belt guide clip 14,16 being attached to the transverse strap 8 via looped attachment straps 18,20 extending through slotted apertures 28 in respective guide clips 14,16 and being connected to an upper region of the transverse strap 8 on a respective side of the base member 2 (FIG. 2), the guide clips 14,16 having respective openings 32 for receiving and guiding a lap belt of a seat belt over the base member 2 to lie in the correct position over the pelvic region of a child seated on the booster cushion and to retain the booster seat 1 in place upon a seat of a vehicle.

The harness 6 provides a reliable and secure mounting for the seat belt guide clips 14,16 and ensures that the clips 14,16 are retained in the correct position on either side of the base member 2 to ensure the correct positioning of the lap belt portion of a seat belt inserted through the openings 32 of the guide clips 14,16 and ensures that the booster cushion remains in place upon a vehicle seat.

A fabric cover 22 is provided over the base member 2 and harness 6, the cover 22 being provided with a raised portion 24 around the rear and lateral sides of an upper face 30 of the cover 22 to provide support for a child sat upon the booster cushion. Slots 26 are provided in the lateral sides of the cover to allow passage of the attachment straps 18,20 of the belt guide clips 14, 16. Preferably the cover 22 is formed from a fireproof or fire resistant material. The cover may be padded for comfort.

The harness 6 may be connected to or incorporated into the cover 22 or may comprise a separate components to allow the cover 22 to be removed separately for washing.

The booster seat 1 can be readily deflated and compressed by opening the air valve to allow the booster seat 1 to be folded and reduced in size for transport and can be readily inflated for use in a vehicle by opening air valve 4, the open cell foam within the base member 2 expanding upon opening of the air valve 4 to cause the base member 2 to expand and inflate. Additional air can be blown into the air valve 4 to further inflate the air chambers within the base member 2, if required. The inflatable base member 4 provides greater comfort while the harness 6 ensures that booster seat remains firmly connected to the lap belt portion of the seat belt via the belt guide clips and that the lap belt portion is correctly positioned over the pelvic region of a child sat on the booster cushion 1.

The booster cushion 1 may be used to enable a child to be safely restrained in a vehicle seat by existing vehicle seat belts. The booster cushion 1 may be used in cars, coaches or vans or in aircraft or any other situation where the child is too small to suit the existing restraint system in a vehicle. The booster seat may also be placed on a seat to raise a child in other applications, such as in cinemas, restaurants etc. The light weight and compact compressed and/or folded dimensions of the booster seat, once deflated, enable the booster seat in accordance with the invention to be easily carried and stored. Thus an inflatable booster seat in accordance to the present invention may be particularly suitable when travelling for use in a number of vehicles, such as aircraft and hire cars, where a suitable booster seat might not otherwise be available.

The invention is not limited to the embodiments described herein but can be amended or modified without departing from the scope of the present invention.

The invention claimed is:

1. A booster cushion for use in a vehicle, the booster cushion comprising:

a base in the form of at least one inflatable member upon which a child may sit;

a harness adapted to fit over at least a front portion of the base to retain the base when the base is positioned on a vehicle seat of the vehicle, said harness comprising a transverse strap and a longitudinal strap, the transverse strap extending transversely across a width of the base, and the longitudinal strap coupled to a lower region of the transverse strap located under the base and extending around a front surface of the base; and seat belt receiving members attached to respective sides of the harness at the transverse strap, wherein the seat belt receiving members are configured for receiving respective portions of a lap belt portion of a seat belt of the vehicle in a manner that (i) retains the base upon the vehicle seat, and (ii) aligns the lap belt portion to extend over the pelvic region of the child when the child is positioned on the inflatable member, upon engagement of the lap belt portion of the seat belt with the seat belt receiving members.

2. A booster cushion as claimed in claim 1, wherein the seat belt receiving members each comprise a seat belt receiving clip through which the lap belt may pass to retain the lap belt therein such that, in use, the lap belt is guided over the pelvic region of the child sitting on the booster cushion and not over the child's stomach.

3. A booster cushion as claimed in claim 2, wherein the seat belt receiving clips are formed from a rigid material.

4. A booster cushion as claimed in claim 2, wherein each seat belt receiving clip comprises an elongate base portion and a pair of inwardly extending opposed arm portions extending from the ends of the base portion to extend parallel to the base portion for retaining a seat belt strap between the base portion and the opposed arm portions, a gap being provided between the arm portions to permit the seat belt strap to be inserted between the base portion and the portions.

5. A booster cushion as claimed in claim 4, wherein the base portion of each seat belt receiving clip is provided with an aperture for receiving a strap member of the harness for securing the respective receiving clip to the harness.

6. A booster cushion as claimed in claim 1, wherein two spaced apart longitudinal straps extend between the upper and lower regions of the at least one transverse strap.

7. A booster cushion as claimed in claim 1, wherein the at least one inflatable member comprises an air tight chamber having an inflation valve for inflating and deflating the chamber.

8. A booster cushion as claimed in claim 7, wherein the chamber contains open cell foam to provide a self inflating effect when the inflation valve is open.

9. A booster cushion as claimed in claim 7, wherein the inflation valve is located on a lower portion of the base, at or adjacent a rear side thereof.

10. A booster cushion as claimed in claim 1, wherein at least an upper portion of the base and harness is covered by a fabric outer cover.

11. A booster cushion as claimed in claim 10, wherein the cover is provided with openings or slots on lateral sides thereof through which the belt receiving members pass.

12. A booster cushion as claimed in claim 11, wherein the openings or slots are provided adjacent an upper side of the cover.

13. A booster cushion as claimed in claim 10, wherein the harness is connected to the outer cover.

14. A booster cushion as claimed in claim 10, wherein an upper portion of the cover is padded for comfort.

15. A booster cushion as claimed in claim 10, further comprising a peripheral member that is attached to an upper portion of the cover to extend around a rear and lateral sides of the cover to provide greater support for the child and to prevent the child from sliding off the sides of the cushion.

* * * * *